US008254086B2

(12) United States Patent
Mastro et al.

(10) Patent No.: US 8,254,086 B2
(45) Date of Patent: Aug. 28, 2012

(54) TWO-STEP SYNTHESIS OF MANGANESE OXIDE NANOSTRUCTURES ON CARBON FOR SUPERCAPACITOR APPLICATIONS

(75) Inventors: Michael A Mastro, Fairfax, VA (US); Francis J. Kub, Arnold, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 225 days.

(21) Appl. No.: 12/835,127

(22) Filed: Jul. 13, 2010

(65) Prior Publication Data
US 2012/0014037 A1 Jan. 19, 2012

(51) Int. Cl.
*H01G 9/00* (2006.01)
(52) U.S. Cl. ........ 361/502; 361/503; 361/504; 361/512; 361/516; 361/519
(58) Field of Classification Search .................. 361/502, 361/503–504, 509, 512, 516–519
See application file for complete search history.

(56) References Cited

U.S. PATENT DOCUMENTS

| | | | |
|---|---|---|---|
| 7,724,500 B2 | 5/2010 | Long et al. | |
| 7,986,509 B2 * | 7/2011 | Seymour | 361/502 |
| 2008/0248192 A1 | 10/2008 | Long et al. | |

OTHER PUBLICATIONS

A. Fischer et al., "Incorporation of Homogeneous, Nanoscale MnO2 within Ultraporous Carbon Structures via Self-Limiting Electroless Deposition: Implications for Electrochemical Capacitors," Nano Letters, vol. 7, No. 2, pp. 281-286 (2007).

A. Fischer et al., "Electroless Deposition of Nanoscale MnO2 on Ultraporous Carbon Nanoarchitectures: Correlation of Evolving Pore-Solid Structure and Electrochemical Performance," J. Electrochem. Soc., vol. 155, No. 3, pp. A246-A252 (2008).

I.H. Kim, et al., "Synthesis and Electrochemical Characterization of Vanadium Oxide on Carbon Nanotube Film Substrate for Pseudocapacitor Applications," J. Electrochem. Soc., vol. 153, No. 6 pp. A989-996 (2006).

Y.T. Kim, et al., "Highly dispersed ruthenium oxide nanoparticles on carboxylated carbon nanotubes for supercapacitor electrode materials," J. Mater. Chem., vol. 15, pp. 4914-4921 (2005).

D. Kalpana et al., "A novel high power symmetric ZnO/carbon aerogel composite electrode for electrochemical supercapacitor," Electrochimica Acta, vol. 52, pp. 309 1315 (2006).

J.P. Zheng et al., "Hydrous Ruthenium Oxide as an Electrode Material for Electrochemical Capacitors," J. Electrochem. Soc., vol. 142, No. 8, pp. 2699-2703 (1995).

C.C. Hu et al., "Effects of preparation variables on the deposition rate and physicochemical properties of hydrous ruthenium oxide for electrochemical capacitors," Electrochimica Acta, vol. 46, pp. 3431-3444 (2001).

(Continued)

*Primary Examiner* — Nguyen T Ha
(74) *Attorney, Agent, or Firm* — Amy Ressing; Joslyn Barritt

(57) ABSTRACT

A process to deposit a conformal coating of manganese oxide nanocrystals within a high surface area connected pore structure of a carbon paper electrode. A two-step process is utilized. In the first step the carbon paper electrode is immersed in an alkaline manganese oxide solution to form a nanocrystal seed layer on the surface and within the pores of the carbon paper. In the second step the seeded carbon paper is immersed in an acidic manganese oxide solution. The result is a densely packed continuous conformal nanocrystal coating both on the surface of the carbon and deep within its pores. The carbon paper is highly suitable for use as an electrode in a supercapacitor.

13 Claims, 8 Drawing Sheets

OTHER PUBLICATIONS

M. Toupin et al., "Influence of Microstucture on the Charge Storage Properties of Chemically Synthesized Manganese Dioxide," Chem. Mater., vol. 14, pp. 3946-3952 (2002).

Y.U. Jeong et al., "Nanocrystalline Manganese Oxides for Electrochemical Capacitors with Neutral Electrolytes," J. Electrochem. Soc., vol. 149, No. 11, pp. A1419-A1422 (2002).

J.W. Long, "Electrochemical Capacitors emPOWERING the 21st Century," The Electrochemical Society Interface, p. 33 (2008).

J.W. Long et al., "Three-Dimensional Battery Architectures," Chem. Rev. No. 104, pp. 4463-4492 (2004).

V. Subramanian et al., "Hydrothermal Synthesis and Pseudocapacitance Properties of MnO2 Nanostructures," J. Phys. Chem. B, No. 109, pp. 20207-20214 (2005).

M.A. Mastro et al., "Luminescence characteristics of zinc oxide nanocrystals deposited on glass via a solution method," Physica E 41 (2009) 487-489.

M.A. Mastro et al., "Rechargeable zinc oxide / carbon nano-structures," Journal of Ceramic Processing Research, vol. 11, No. 1, pp. 40-43 (2010).

\* cited by examiner

TWO-STEP SYNTHESIS OF MANGANESE OXIDE NANOSTRUCTURES ON CARBON FOR SUPERCAPACITOR APPLICATIONS

TECHNICAL FIELD

The present invention relates to nanotechnology and nanoelectronics, especially creation of a layer of manganese oxide nanocrystals on mesoporous carbon for use as an electrode for a pseudocapacitor.

BACKGROUND

Modern technology is focusing increasingly on portable electronic devices, not only in the consumer realm but in the industrial and military realm as well. Such portable devices rely on portable energy sources, and require ever-increasing energy storage capacity. The three major energy storage devices are batteries, capacitors, and supercapacitors, which bridge the characteristics of a batteries and capacitors. The billion-dollar supercapacitor market is expected to increase rapidly as portable electronic devices expand into new consumer, industrial, and military applications.

A supercapacitor can store energy through a capacitive process, such as an electrochemical double layer capacitor (EDLC), or through a Faradic battery-like reaction termed a pseudocapacitor.

An EDLC generates a double layer capacitance by charge separation at an interface between an electrolyte and a high surface area electrode such as activated carbon, carbon nanotubes (CNTs) or similar materials. See A. Fischer et al., "Incorporation of Homogeneous, Nanoscale $MnO_2$ within Ultraporous Carbon Structures via Self-Limiting Electroless Deposition: Implications for Electrochemical Capacitors," *Nano Letters*, Vol. 7, No. 2, pp. 281-286 (2007); and A. Fischer et al., "Electroless Deposition of Nanoscale $MnO_2$ on Ultraporous Carbon Nanoarchitectures: Correlation of Evolving Pore-Solid Structure and Electrochemical Performance," *J. Electrochem. Soc.*, Vol. 155, No. 3, pp. A246-A252 (2008). The EDLC has large power densities by the fast absorption/desorption kinetics of protons but the energy density is limited. See I. H. Kim, et al., "Synthesis and Electrochemical Characterization of Vanadium Oxide on Carbon Nanotube Film Substrate for Pseudocapacitor Applications," *J. Electrochem. Soc.*, Vol. 153, No. 6 pp. A989-996 (2006); and Y. T. Kim, et al., "Highly dispersed ruthenium oxide nanoparticles on carboxylated carbon nanotubes for supercapacitor electrode materials," *J. Mater. Chem.*, Vol. 15, pp. 4914-4921 (2005).

In contrast, a pseudocapacitor operates by an electrochemical reversible Faradaic redox reaction at a solid electrode of a conducting polymer or a metal oxide. The fast redox reaction gives the pseudocapacitor superior energy density but at a lower power density compared to an EDLC. I. H. Kim, supra; Y. T. Kim, supra.

Kalpana et al. proposed combining the double layer capacitance of large surface area nano-carbon aerogel with the Faradaic capacitance of zinc oxide (ZnO). See D. Kalpana et al., "A novel high power symmetric ZnO/carbon aerogel composite electrode for electrochemical supercapacitor," *Electrochimica Acta*, Vol. 52, pp. 309-1315 (2006). This carbon aerogel/ZnO composite showed high electrochemical reversibility and capacitive characteristics in a KOH electrode.

The highest power density pseudocapacitor was constructed with hydrated ruthenium oxide ($RuO_2$) in a highly acidic sulfuric acid electrolyte. See J. P. Zheng et al., "Hydrous Ruthenium Oxide as an Electrode Material for Electrochemical Capacitors," *J. Electrochem. Soc.*, Vol. 142, No. 8, pp. 2699-2703 (1995); and C. C. Hu et al., "Effects of preparation variables on the deposition rate and physicochemical properties of hydrous ruthenium oxide for electrochemical capacitors," *Electrochimica Acta*, Vol. 46, pp. 3431-3444 (2001).

However, the high cost of ruthenium and a desire to operate in a neutral electrolyte has positioned manganese oxide as a cost-effective solution. See M. Toupin et al., "Influence of Microstructure on the Charge Storage Properties of Chemically Synthesized Manganese Dioxide," *Chem. Mater.*, Vol. 14, pp. 3946-3952 (2002); and Y. U. Jeong et al., "Nanocrystalline Manganese Oxides for Electrochemical Capacitors with Neutral Electrolytes," *J. Electrochem. Soc.*, Vol. 149, No. 11, pp. A1419-A1422 (2002).

The reduction-oxidation reaction with the manganese oxide layer has a limited stability regime in an electrochemical-type cell. The upper voltage is limited by the onset of a non-reversible redox oxygen evolution process and the lower voltage is limited by the non-reversible reduction and dissolution of the manganese ion. Therefore, the most useful design is as an asymmetric device with an activated-carbon paper negative electrode and a pseudocapacitve manganese oxide-carbon paper positive electrode. A nanoscopically thin manganese oxide coating in close proximity to the highly conductive carbon minimizes the impact of the low conductivity of manganese oxide. See J. W. Long, "Electrochemical Capacitors emPOWERING the 21st Century," *The Electrochemical Society Interface, p. 33* (2008).

Despite the advantages of using a porous carbon paper electrode, however, deposition of a nanometer-scale thick layer of a metal oxide such as manganese oxide conformally throughout the entire high-surface area carbon paper is extremely challenging.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides a process to deposit a conformal coating of manganese oxide nanocrystals within a high surface area connected pore structure of a carbon paper electrode. In accordance with the present invention, a two-step process is utilized to first form a nanocrystal seed layer in an alkaline solution followed by formation of a continuous conformal nanoscale layer in an acidic solution.

In the first step, a seed layer of manganese oxide nanocrystals is formed by placing a carbon paper electrode in an appropriate alkaline solution in a chemical bath. In some embodiments, the chemical bath is a pressure-restricted vessel while in other embodiments it is an open vessel such as a beaker or larger vessel. The temperature of the solution may range from room temperature up to the boiling point of the solvent, depending on whether the chemical bath is open or closed, with a pressure-restricted vessel allowing a higher reaction temperature.

In the second step, the manganese oxide-seeded carbon paper is immediately placed in an appropriate acidic solution in a chemical bath. Analogous to the discussion above, in some embodiments the chemical bath is a pressure-restricted vessel and in other embodiments is an open vessel such as a beaker or larger open vessel. The reaction can take place at a temperature ranging from room temperature to near the boiling point of the solvent in an open vessel or at a higher temperature in a pressure-restricted vessel.

As a result of this two-step approach, a manganese oxide nanocrystal layer can be conformally deposited both on the surface and within the pores of the carbon paper electrode.

The two-step process in accordance with the present invention can also be used for deposition of other metal oxides such as lithium manganese oxide, ruthenium oxide, or zinc oxide on any carbon substrate such as solid carbon, carbon nanotubes, carbon aerogel, graphitic carbon, carbon paper, or graphene.

DETAILED DESCRIPTION

The aspects and features of the present invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

For example, although the process in accordance with the present invention is described below in the context of formation of a conformal layer of manganese oxide nanocrystals on a carbon paper substrate, the process in accordance with the present invention can also be used to deposit other metal oxides such as lithium manganese oxide, ruthenium oxide, and zinc oxide on any form of carbon, including solid carbon, carbon nanotubes, carbon aerogel, graphitic carbon, carbon paper, and graphene.

As noted above, there has been a need for the development of supercapacitors utilizing an activated-carbon paper negative electrode and a pseudocapacitve manganese oxide positive electrode. The mesoporous carbon material provides a convenient conductive template for the creation of a hybrid manganese oxide mesoporous structure suited for infiltration and rapid transport to the electrolyte.

Creating a conformal coating of manganese oxide within carbon paper mesopores, however, is non-trivial. The present invention provides a simple, scalable solution approach to fabricate a manganese oxide layer on a carbon paper structure with high cyclic-voltammetry metrics.

These and other aspects of a process for depositing a conformal coating of manganese oxide nanocrystals on a mesoporous carbon paper electrode will now be described in detail with reference to the Figures, which form a part of the disclosure.

Figure 1A:
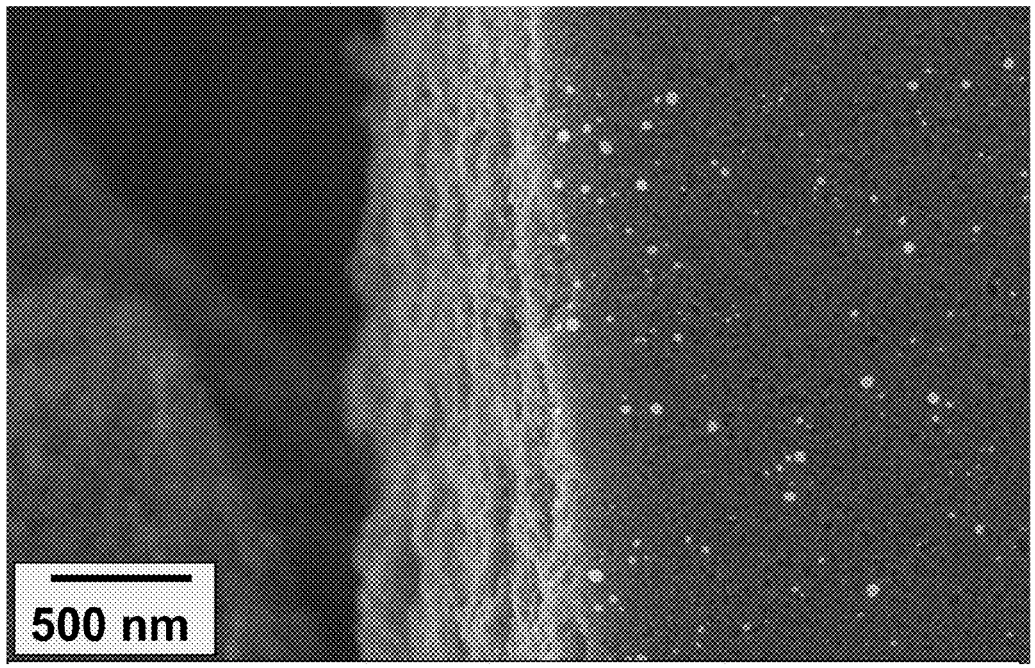
FIGS. 1A and 1B are electron micrographs depicting the pore structure of carbon paper that can receive deposition of manganese oxide nanocrystals in accordance with the present invention.
Figure 1B:
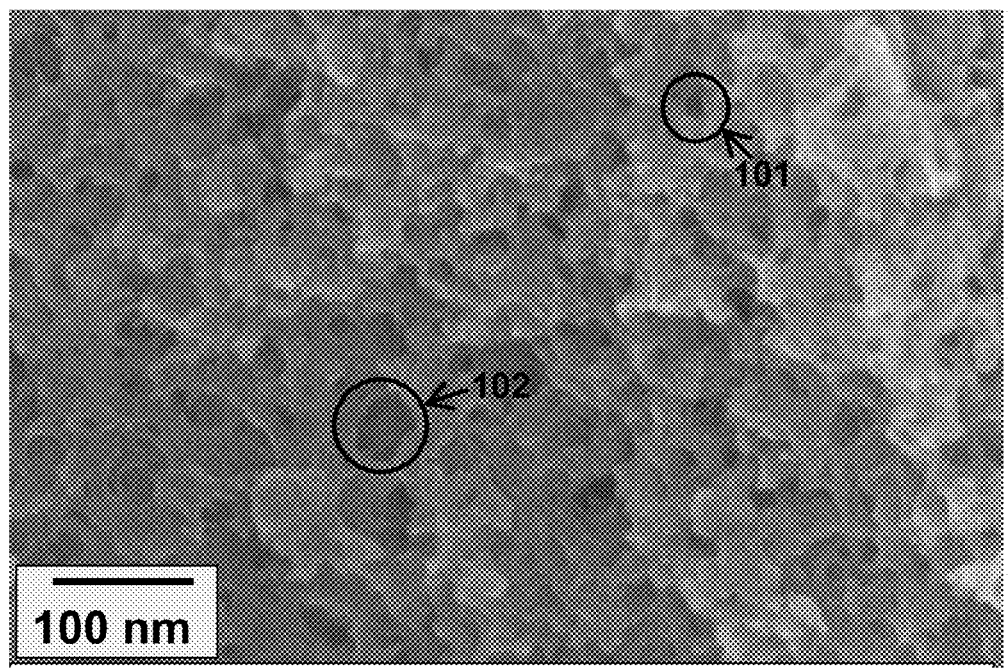

FIGS. 1A and 1B depict electron micrographs of exemplary carbon paper that can be used in the method of the present invention. As can be seen from FIGS. 1A and 1B, such carbon paper is a mesoporous material containing pores ranging in size from about 2 μm in diameter, e.g., pore 101 shown in FIG. 1B, to about 50 μm, e.g., pore 102. The porosity of the carbon electrode increases its surface area and acts as a template to increase the surface area of the thin manganese oxide layer deposited thereon. This increase in effective surface area proportionally increases the charge stored on the electrode structure compared to the charge on a flat structure.

Coating such a carbon paper electrode with a nanoscopically thick manganese oxide layer introduces a redox-type reaction that increases the energy density of the device. Lack of deposition of the manganese oxide layer into some areas of the pore structure proportionally reduces the benefit of the added redox reaction, and so it is desirable to have the manganese oxide cover as much of the carbon paper surface and pores as possible. However, the ability of the manganese oxide to penetrate the pores is limited by the minimum pore size needed for the cation to transport in the pore. In other words, not all of the area of a nanoporous structure would be accessible to the manganese cations, and thus a method is needed to assist in depositing the manganese into the pores.

The inventors of the present invention have found that an alkaline solution is best for transporting manganese ions deep into the porous carbon structure while discouraging deposition at unstable nucleation sites along the pore sidewalls and that an acidic solution is advantageous for creating a thin conformal layer of manganese oxide on the carbon surface. Thus, as described in more detail below, in accordance with the present invention, manganese oxide nanocrystals can be conformally deposited both on the surface and within the pores of a carbon structure by means of a two-step process that combines use of an alkaline solution in the first step with an acidic solution in the second step. The two-step method of the present invention first introduces the manganese oxide completely into the bottom of the porous carbon structure and then produces a conformal manganese oxide layer on the entire carbon structure. Both steps can be accomplished with a simple, scalable wet process which is advantageous for low-cost, high-volume manufacture.

In the first step of a process for forming a conformal layer of manganese oxide nanocrystals on carbon in accordance with the present invention, a carbon template such as a carbon paper electrode is immersed into an appropriate alkaline manganese solution composed of a soluble manganese salt such as potassium permanganate $KMnO_4$ and a basic compound such as KOH or NaOH to maintain a pH greater than 7 in the chemical bath. In some embodiments, the chemical bath used in this first step can be an open container such as a beaker or larger vessel, while in other embodiments it can be a closed pressure-restricted vessel normally composed of a stainless steel shell and a replaceable Teflon or similar liner. The term "pressure-restricted" implies a built in mechanism to release excess pressure as a process control as well as a safety mechanism. Chemical bath deposition in a pressure-restricted vessel is commonly referred to as "hydrothermal" if a water-based solvent is used, and as "solvothermal" if an alcohol or other non-aqueous solvent is used for the solution. The solution can be neutral (pH 7) to highly alkaline (pH 14). The temperature can range from room temperature up to the boiling point of the solvent or higher, e.g., from about 25° C. to about 400° C., and the immersion time can range from about 1 minute to about 20 hours. Reaction in an open vessel will be conducted at lower temperatures, e.g., at 100° C. for a solution using water as the solvent. The pressure-restricted vessel allows a higher reaction temperature, which, in combination with the higher pressure, will accelerate the reaction rate. The reaction temperatures and time can be varied, with lower temperatures requiring longer reaction times and vice versa. For example, a sufficient density of nanocrystals is formed on the carbon substrate within 30 minutes of immersion at 90° C., but similar results can be achieved at a lower temperature by employing a reaction time of several hours.

The use of an alkaline solution in a first step of a manganese oxide deposition process in accordance with the present invention encourages the deposition of manganese oxide ions deep into the pores of the carbon as well as on the surface. At the initial stages of this first step in accordance with the present invention, the reaction rapidly forms manganese oxide nanocrystals, primarily in the form of cylindrical nanorods, throughout the carbon pore structure. These nanorods are deposited both on the surface and in the pores of the carbon sample such as pores 301 and 302 illustrated in FIGS. 3A and 3B, described in more detail below. Longer reaction times extend the size of the nanorods, but the reaction self-limits as the reactants are depleted in this batch process. In any case the exact geometry of the nanorods is not critical to the formation of the final coating resulting from step two. Rather, the manganese oxide nanorods produced in this first step act as a seed layer to enhance the deposition of the thin conformal layer of manganese oxide deep into the carbon pore structure in step two described below.

After the formation of the seed layer described above, in the second step of the process for growing a conformal coating of manganese oxide nanocrystals on carbon in accordance with the present invention, the manganese oxide nanocrystal-seeded carbon paper is immediately transferred to an appropriate acidic manganese salt solution in a chemical bath. As with the first step, the reaction can be "hydrothermal" if a water-based solvent is used and "solvothermal" if an alcohol or other non-aqueous solvent is used for the solution, with the pH of the solution ranging from 1 for a highly acidic solution to 7 for a neutral solution. The temperature can range from room temperature, e.g., about 25° C., to about 400° C., and the immersion time can range from about 5 minutes to about 20 hours, depending on the reaction temperature. For example, the seeded carbon can be reacted in the acid bath for approximately one hour at 150° C., longer times at lower temperatures, or shorter times at higher temperatures, with similar results. In addition, as with the first step, in some embodiments the reaction of this second step can take place in an open container, while in other embodiments the reaction can occur in a pressure-restricted vessel, with the use of a pressure-restricted vessel permitting reaction at higher temperatures.

The reaction mechanism in a neutral or acidic solution in the second step in accordance with the present invention is such that the manganese source, e.g., the manganese oxide nanocrystals deposited during the first step described above, tends to react before diffusing to the bottom of the carbon pores and subsequently reacting at the bottom of the pores. Immersion of the seeded carbon paper in the acidic solution in accordance with this second step creates a simultaneous etch-deposition mechanism, where the manganese oxide seed layer formed in the first step acts as a second source of reactant for the second step in addition to the reactant from the acid solution, with some small percentage of this second source of reactant remaining at or near the bottom of the pores. Thus, the manganese oxide provided by the acid solution in the second step does not have to diffuse through the entire pore structure of the seeded carbon paper, as the manganese oxide reactant from the first step provides a source of reactant for the formation of manganese oxide nanocrystals deep within the pores of the carbon paper.

The result is a carbon paper electrode having a nanometer-scale layer of manganese oxide conformally deposited not only on the surface of the carbon paper but also within its pores. The nanoscopically thin manganese oxide coating produced in accordance with the present invention is in close proximity to the highly conductive carbon and so minimizes the impact of the low conductivity of the manganese oxide in addition to minimizing the distance for solid-state transport of the insertion cations. In addition, the manganese oxide coating by itself has texture beyond that of the underlying porous carbon template, which further increases the surface area of the electrode and improves its capacitance and energy density.

EXAMPLE

A conformal coating of manganese oxide nanocrystals was formed on a carbon paper electrode using the two-step method of the present invention. Prior to growth a carbon nanofoam (aerogel) paper electrode was washed in methanol and deionized water. Then, in the first step according to the present invention, the carbon paper electrode was immersed in an alkaline solution comprising 10 mL of 0.01M potassium permanganate ($KMnO_4$) and 1 mL of 0.001M sodium hydroxide (NaOH) in an open beaker at 90° C. for 1 minute. As described above, this first step encouraged the deposition of manganese oxide nanocrystals deeper into the mesoporous carbon structure. The manganese oxide-seeded carbon paper electrode was then in the second step immediately transferred to an acidic solution comprising 10 mL of 0.01M $KMnO_4$ and 2 mL of hydrogen fluoride (HF) in a hydrothermal chamber and held at 150° C. for 2 hours.

Figure 2A:
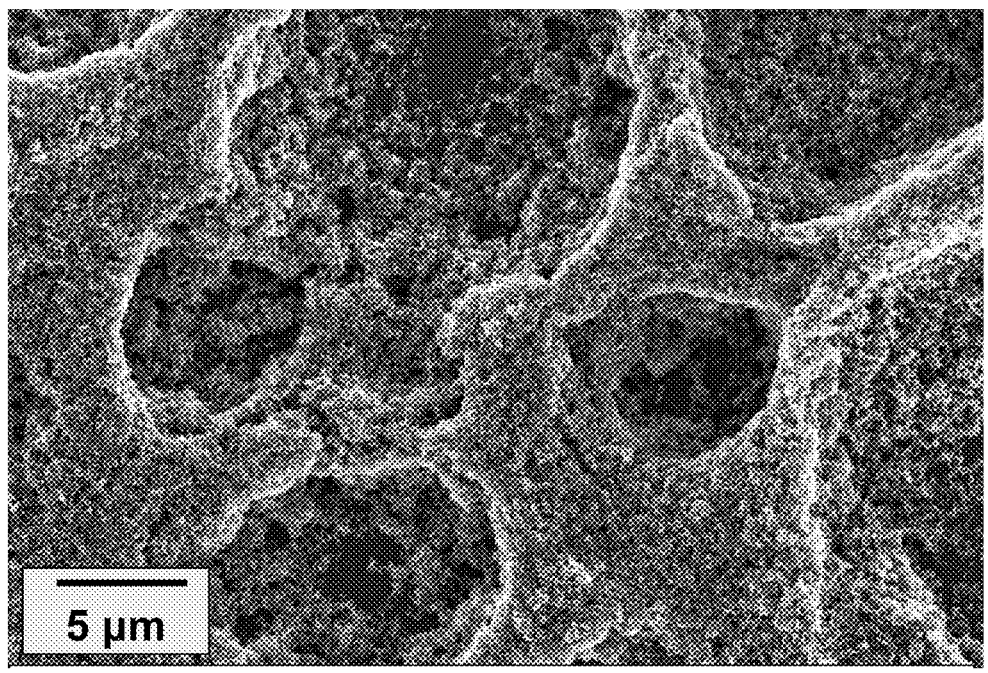
FIGS. 2A-2D are electron micrographs depicting, at increasing resolution, manganese oxide nanocrystals deposited into mesoporous carbon paper in accordance with the two-step process of the present invention.
Figure 2B:
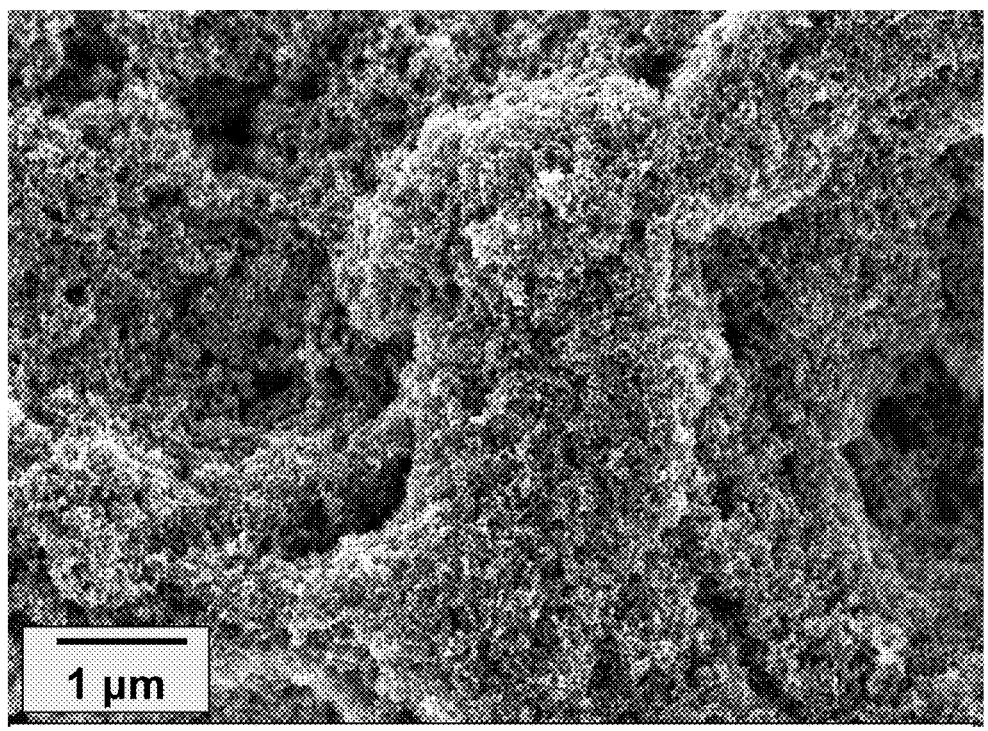
Figure 2C:
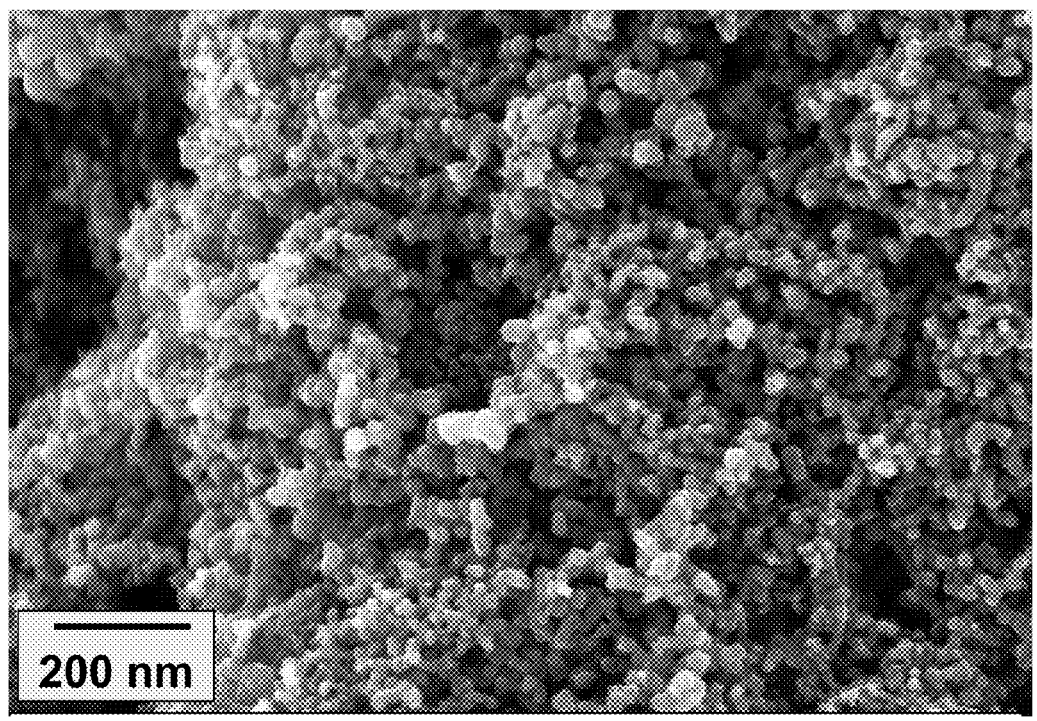
Figure 2D:
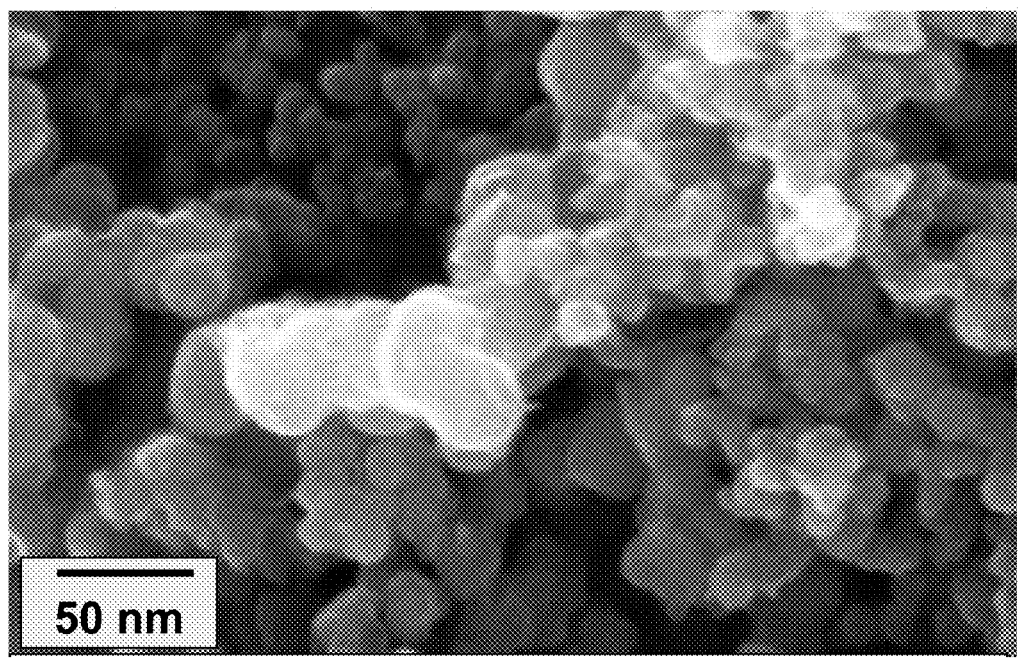

The coated carbon paper resulting from this two step-process is illustrated in the electron micrographs shown in FIGS. 2A-2D, which show the coated carbon paper at increasing resolutions of 5 μm (FIG. 2A), 1 μm (FIG. 2B), 200 nm (FIG. 2C), and 50 nm (FIG. 2D). As can clearly be seen in these micrographs, manganese oxide nanocrystals form a closely-packed coating both on the outer surface of the carbon paper and deep within the pores. Any nanorod protruding far above the surface has been reduced in the acidic solution and reformed in the compact nanocrystal layer. As discussed above, the high-aspect ratio nanorods present a resistive path to electron transport and thus less are desired than a thin layer.

Thus, the two-step process of the present invention, which combines brief immersion of the carbon substrate in an appropriate alkaline solution with a longer immersion of the carbon substrate in an appropriate acidic solution produces a nano-thickness manganese oxide coating in close proximity to the highly conductive carbon, which minimizes the impact of the low conductivity of manganese oxide in addition to minimizing the distance for solid-state transport of the insertion cations.

Figure 3A:
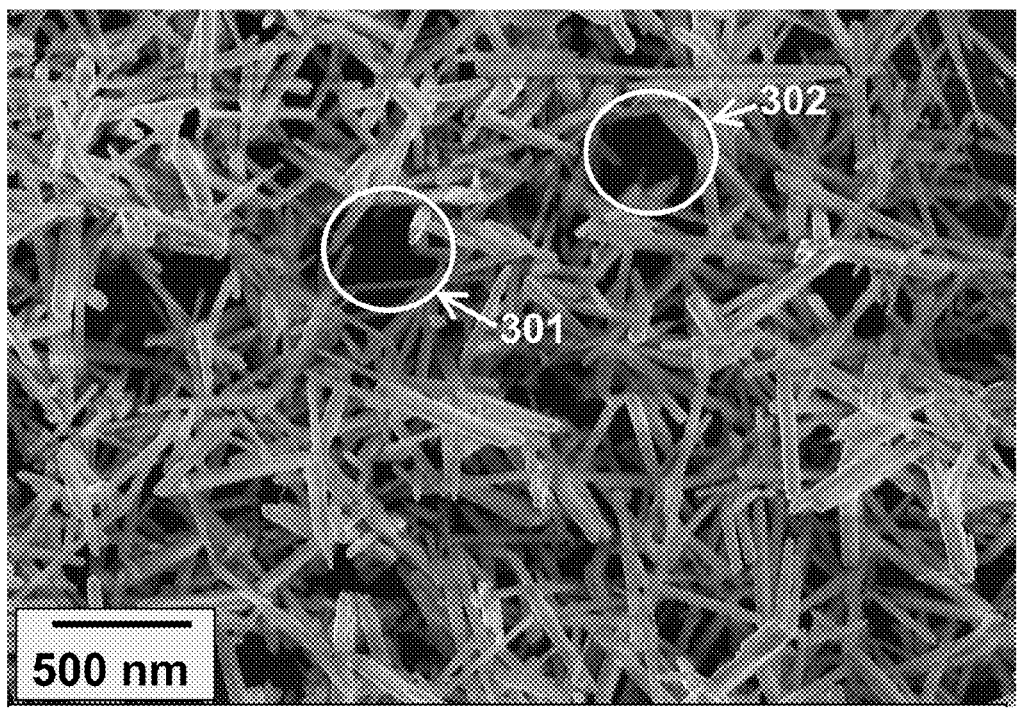
FIGS. 3A and 3B are electron micrographs depicting manganese oxide nanorods resulting from the first step of the deposition process in accordance with the present invention.
Figure 3B:
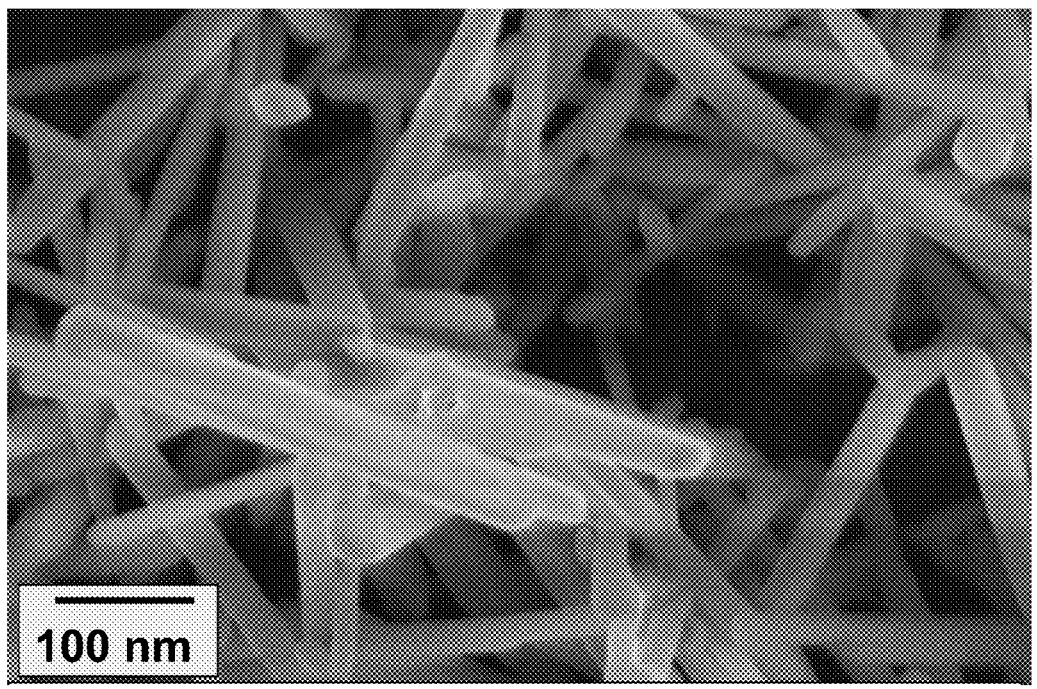

In contrast, as noted above, reaction of the carbon paper in the same alkaline solution for a long period of time would produce cylindrical nanorods such as those depicted in the electron micrographs shown in FIGS. 3A and 3B. In the exemplary case illustrated in FIGS. 3A and 3B, the solution growth of the nanorods proceeded rapidly, with large areas of the carbon paper covered after 10 minutes of growth. A deposition time beyond approximately one hour yielded a packed array of nanorods such as that shown in FIGS. 3A and 3B.

These nanorods have a length of about 250 nm to 500 nm, in contrast to the nanocrystals produced in accordance with the present invention, which, as can be seen from FIGS. 2C and 2D, are only about 25-50 nm in diameter. As also can be seen in FIGS. 3A and 3B, although the nanorods are deposited both on the surface of the carbon paper and into the pores of the carbon, they are not densely packed, either on the surface or in the pores. In contrast, the manganese oxide nanocrystals produced in the two-step alkaline/acid reaction method of the present invention are deposited throughout the carbon's surface and its pores. Any manganese oxide nanorods produced in the first step have been reduced and reformed in the second step to form the thin dense packing of nanocrystals shown in FIGS. 2A-2D.

A pseudocapacitor having a carbon paper electrode with a manganese oxide nanocrystal coating in accordance with the present invention is able to operate at a higher power density than a pseudocapacitor having either a nanorod-coated carbon electrode or an uncoated supercapacitor. An uncoated carbon electrode supercapacitor design stores charge at the electrolyte/carbon interface. A manganese oxide coating adds the Faradic response of the manganese oxide to increase the energy storage capacity beyond that available with a simple double-layer capacitance mechanism. Unfortunately, manganese oxide is relatively resistive compared to the carbon electrode. Therefore an electron attempting to travel from the top of the nanorod faces a large series resistance to reach the carbon electrode and enter the circuit. If the depth of the manganese oxide coating is reduced, e.g., by reforming the cylindrical nanorods into the more spherical nanocrystals produced in accordance with the present invention, this resistance is also greatly reduced, and the electron can travel much more efficiently into the circuit.

To test the improved performance of a coated carbon paper electrode in accordance with the present invention, a first carbon paper electrode was conformally coated with manganese oxide nanocrystals using the two-step process of the present invention, while a second carbon paper electrode was coated with high aspect-ratio manganese oxide nanorods by alkaline immersion as described above and a third carbon paper electrode was left uncoated. Cyclic-voltammetry studies were performed using a potentiostat/galvanostat in a three-electrode configuration with manganese oxide as the working electrode, silver as the counter, and a saturated calomel electrode as the reference. The cyclic-voltammetry was performed between −0.2 and 0.8 V in 0.5M sodium sulfate (Na$_2$SO$_4$). The upper voltage is limited by the onset of a non-reversible redox oxygen evolution process and the lower voltage is limited by the non-reversible reduction and dissolution of the manganese ion. Structural characterization was performed with a Panalytical X'pert x-ray diffraction system and a LEO field emission scanning electron microscope.

Figure 4A:
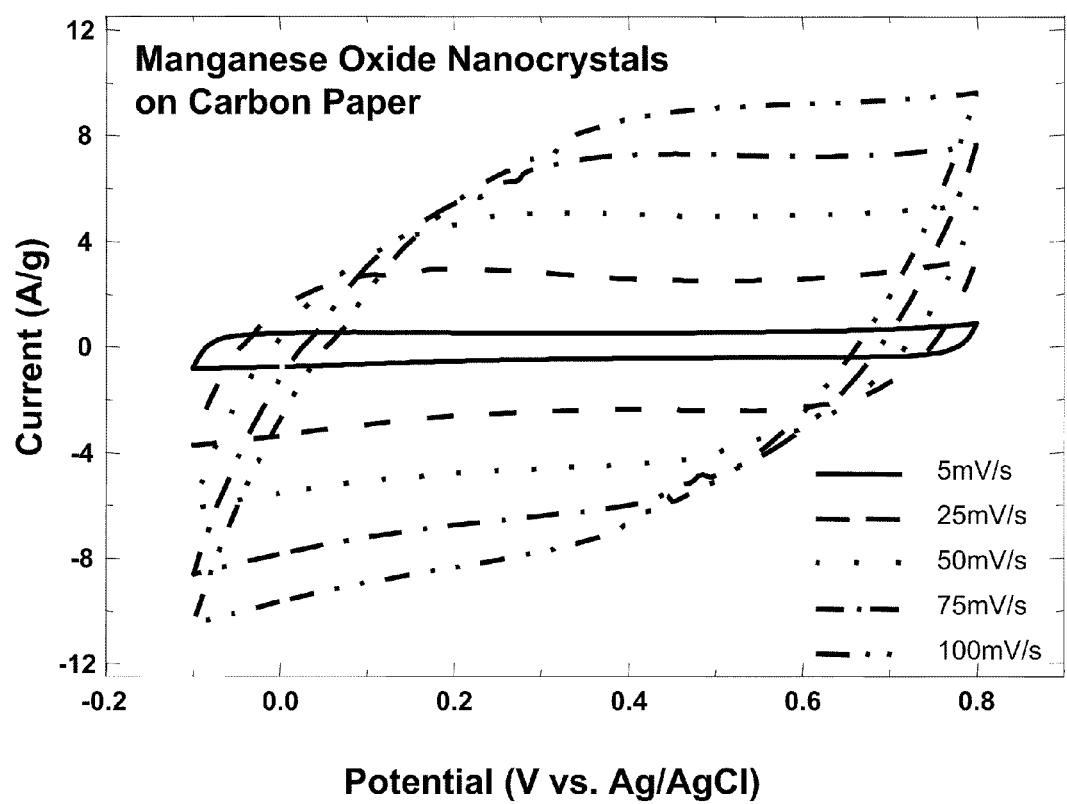
FIGS. 4A-4C depict plots showing cyclic-voltammetry of manganese oxide nanorods (FIG. 4A) and manganese oxide nanocrystals (FIG. 5B) on carbon paper and of a reference carbon paper electrode in 0.5M $Na_2SO_4$ (FIG. 5C) at scan rates ranging from 5 mV/s to 100 mV/s.
Figure 4B:
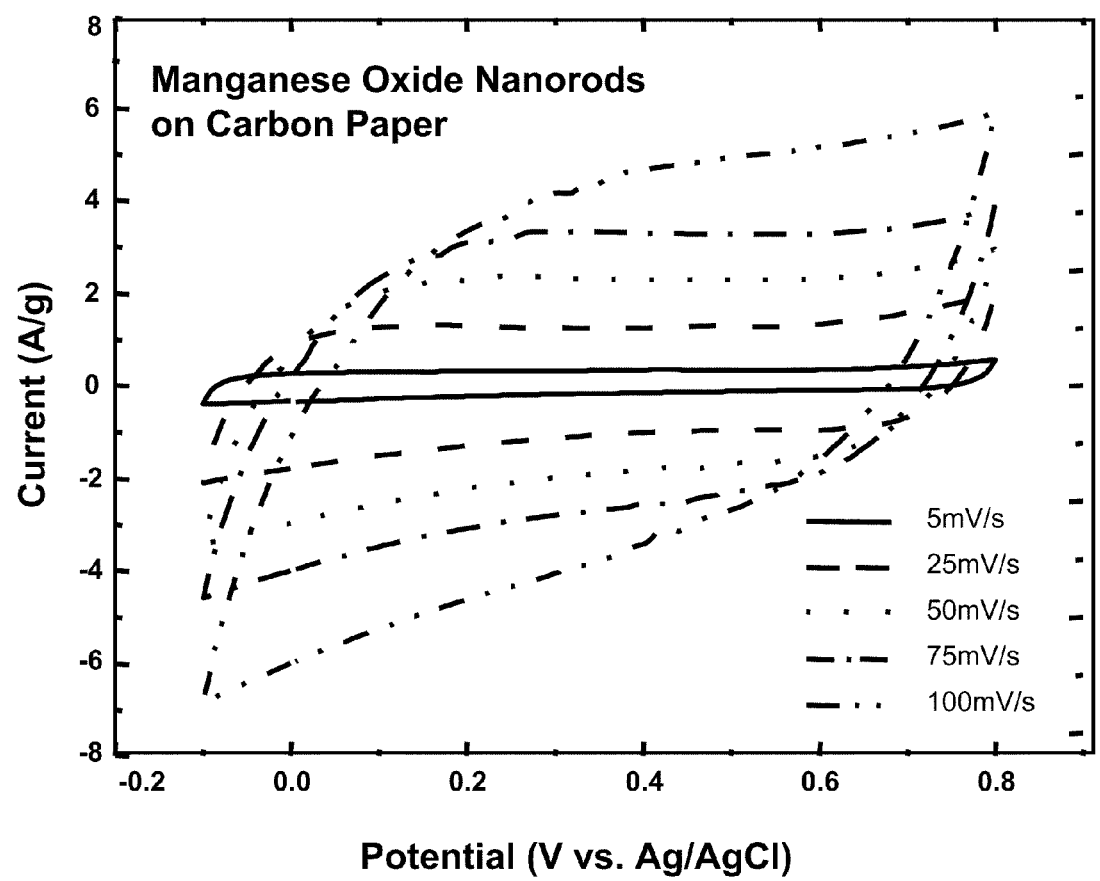
Figure 4C:
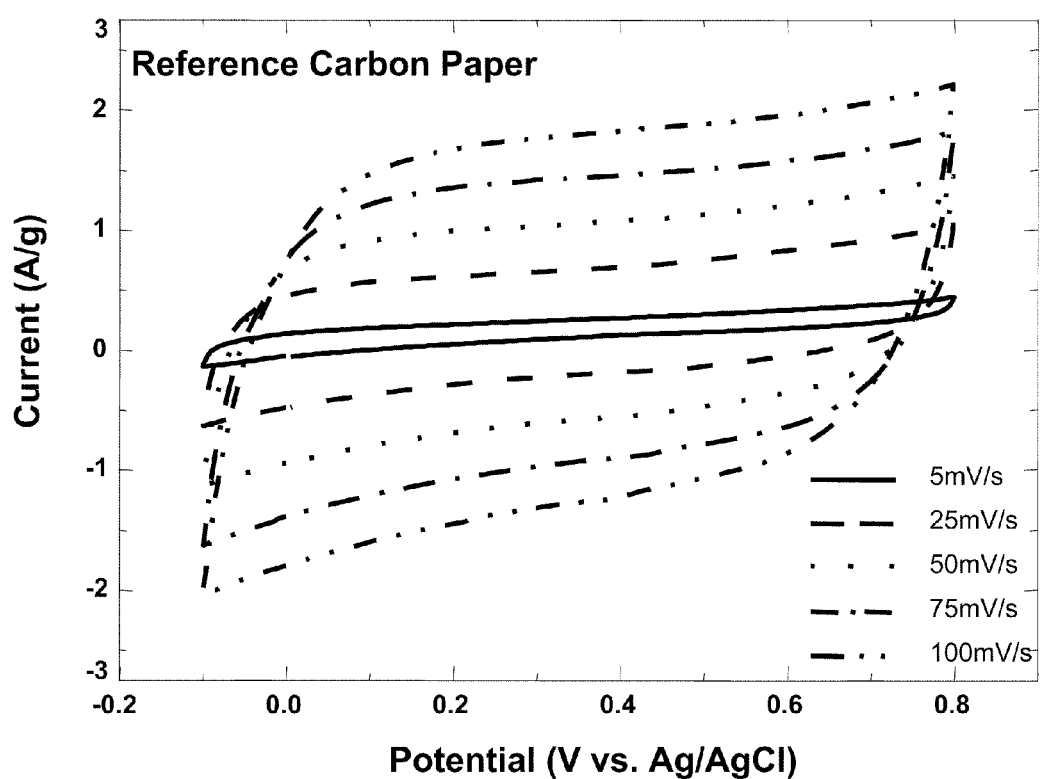

The cyclic-voltammetry measurements of the manganese oxide nanocrystals and nanorods on carbon paper as well as the bare carbon electrode are shown in FIGS. 4A-4C and FIG. 5 and confirm the improved performance of the carbon paper electrode having a conformal manganese oxide nanocrystal coating produced in accordance with the present invention. It should be noted here that the vertical scales of FIGS. 4A-4C are different from each other. That is, the scale of FIG. 4A ranges from −12 to +12 A/g, the scale of FIG. 4B ranges from −8 to +8 A/g, and the scale of FIG. 4C ranges from −3 to +3 A/g. The vertical scale of FIG. 5 ranges from −8 to +8 A/g.

Figure 5:
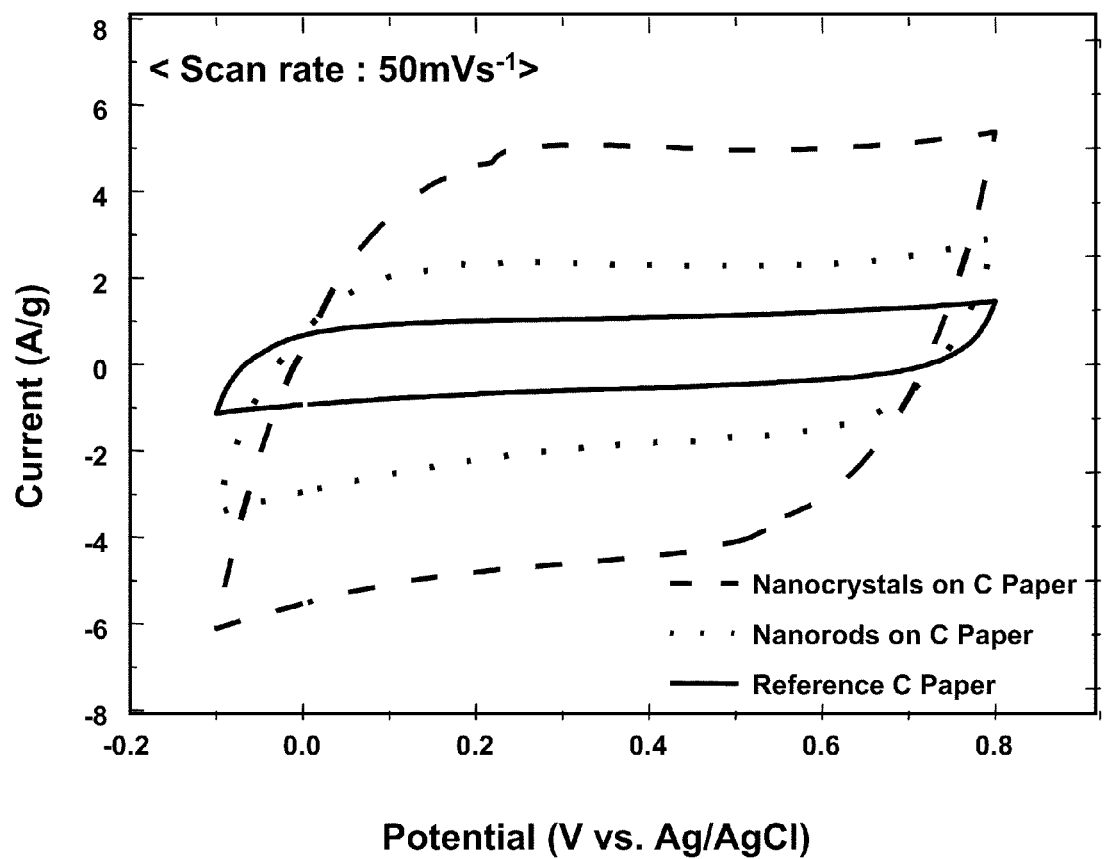
FIG. 5 depicts a plot showing a comparison of cyclic-voltammetry of manganese oxide nanorods and manganese oxide nanocrystals on carbon paper as well as a reference carbon paper electrode in 0.5M $Na_2SO_4$ at a scan rate of 50 mV/s.

The ideal shape of a cyclic-voltammetry curve resembles a parallelogram. As can be seen in FIG. 5, the cyclic-voltammetry curve of the bare carbon-electrode is closer to an ideal parallelogram shape as there is no pseudocapacitance redox reaction As can be seen in FIGS. 4A and 4B, the profiles exhibited by the coated carbon paper deviated from the ideal as the scan rate increased, and especially so for the nanorods on carbon paper, as seen in FIG. 4B. Specifically, the range of potential accessible at high scan rates is caused by the inability in the redox reaction for the alkali ion from the electrolyte to rapidly insert-deinsert in the mesoporous structure. See J. P. Zheng et al., supra. This decrease in the interaction between the ions and the electrode effectively reduces the capacitance of the structure. Nevertheless, as can be derived from the plots shown in FIGS. 4A-4C, at a scan rate of 25 millivolts per second (mV/s), the manganese oxide nanocrystals on carbon paper (FIG. 4A) displayed a specific capacitance of 140 farads per gram (F/g) and the manganese oxide nanorods on carbon paper (FIG. 4B) displayed a specific capacitance of 83 F/g, both of which are significantly better than the specific capacitance of 47 F/g for bare carbon electrode (FIG. 4C). These specific capacitance figures can be derived from the relation between farad $$F = \frac{C}{V}$$

and capacitance $$C = \left(\frac{dQ}{dV}\right) = IA\left(\frac{dV}{dt}\right),$$

where Q is the charge stored in the electrode, I is the current density in milliamps per square centimeter $$\left(\frac{mA}{cm^2}\right),$$

A is the surface area of the electrode (cm$^2$), and $$V = \frac{dE}{dt}$$

is the potential scan rate. These relations can be normalized to a specific value per mass unit, i.e., Farad per gram (F/g) described above.

As noted above, the method of the present invention produces a nanoscopically thin manganese oxide coating on a highly conductive carbon electrode. The thin manganese oxide layer adds little series resistance to the overall device and the meso-scale morphology is well suited for insertion and removal of the cations at the manganese oxide surface/electrolyte interfacial area. See J. W. Long, supra. This mechanism explains why, as shown in FIG. 5, the nanorod-coated carbon, which has a higher surface area, displays a smaller cyclic-voltammetry response compared to the nanocrystal samples. In effect, the internal resistance of the manganese oxide limited the reduction-oxidation reaction to only the base region of the nanorod, which is in close electrical contact with the underlying conductive carbon conductor, while the reduction-oxidation reaction at the tip of the nanorod is discouraged by the series resistance through the length of the manganese oxide nanorod.

Thus, the present invention provides a simple, inexpensive, scalable method for producing a conformal layer of manganese oxide nanocrystals on a mesoporous carbon which can then be advantageously used as an electrode for a pseudocapacitor to provide improved performance and greater energy storage capabilities.

As will readily be appreciated by one skilled in the art, the two-step process in accordance with the present invention can also be used for deposition of other metal oxides such as lithium manganese oxide, ruthenium oxide, or zinc oxide on any carbon substrate such as solid carbon, carbon nanotubes, carbon aerogel, graphitic carbon, carbon paper, or graphene.

In addition, the present invention also provides a pseudocapacitor comprising an asymmetric device having an activated-carbon negative electrode and a pseudocapacitve manganese oxide-on-carbon positive electrode produced using the two-step deposition process described herein. Such a pseudocapacitor provides an especially advantageous design to avoid the negative voltage limitations of manganese oxide.

Although particular embodiments, aspects, and features have been described and illustrated, it should be noted that the invention described herein is not limited to only those embodiments, aspects, and features. It should be readily appreciated that modifications may be made by persons skilled in the art, and the present application contemplates any and all modifications within the spirit and scope of the underlying invention described and claimed herein. Such embodiments are also contemplated to be within the scope and spirit of the present disclosure.

What is claimed is:

1. A process for forming a conformal nanoscale metal oxide coating on a porous carbon sample, comprising:
   immersing the carbon sample in an alkaline metal oxide solution at a temperature of about 25° C. to about 400° C. for a time of about 1 minute to about 20 hours to form a seed layer of metal oxide nanocrystals on the carbon sample; and
   immediately thereafter immersing the seeded carbon sample in an acidic metal oxide solution at a temperature of about 25° C. to about 400° C. for a time of about 5 minutes to about 20 hours;
   wherein a densely packed thin conformal layer of metal oxide nanocrystals is formed on the surface and within the pores of the carbon sample.

2. The process according to claim 1, wherein the metal oxide comprises manganese oxide ($MnO_2$).

3. The process according to claim 1, wherein the metal oxide comprises one of lithium manganese oxide, ruthenium oxide, and zinc oxide.

4. The process according to claim 1, wherein the carbon sample comprises a carbon paper electrode configured for use in a supercapacitor.

5. The process according to claim 1, wherein the carbon sample comprises one of solid carbon, carbon nanotubes, carbon aerogel, graphitic carbon, and graphene.

6. The process according to claim 1, wherein the carbon sample is immersed in the alkaline solution in an open container to form the seeded carbon sample.

7. The process according to claim 6, wherein the seeded carbon sample is immersed in the acid solution in an open container.

8. The process according to claim 6, wherein the seeded carbon sample is immersed in the acid solution in a pressure-restricted vessel.

9. The process according to claim 1, wherein the carbon sample is immersed in the alkaline solution in a beaker for 30 minutes at about 90° C. to form the seeded carbon sample.

10. The process according to claim 1, wherein the carbon sample is immersed in the alkaline solution in a pressure-restricted vessel to form the seeded carbon sample.

11. The process according to claim 10, wherein the seeded carbon sample is immersed in the acid solution in an open container.

12. The process according to claim 10, wherein the seeded carbon sample is immersed in the acid solution in a pressure-restricted vessel.

13. The process according to claim 1, wherein the metal oxide coating is formed from a single metal oxide.

* * * * *